(12) United States Patent
Bjurenvall

(10) Patent No.: US 7,005,155 B2
(45) Date of Patent: Feb. 28, 2006

(54) CEREAL PRODUCT AND PROCESS

(76) Inventor: Ingemar Bjurenvall, 2 Chester Street, London SW1X 7BB (GB)

( * ) Notice: Subject to any disclaimer, the term of this patent is extended or adjusted under 35 U.S.C. 154(b) by 87 days.

(21) Appl. No.: 10/218,754

(22) Filed: Aug. 14, 2002

(65) Prior Publication Data

US 2003/0031779 A1 Feb. 13, 2003

Related U.S. Application Data

(63) Continuation of application No. PCT/SE01/00319, filed on Feb. 15, 2001.

(30) Foreign Application Priority Data

Feb. 23, 2000 (SE) .............................. 0000577

(51) Int. Cl.
A23L 1/0522 (2006.01)
A23L 1/0562 (2006.01)
A23L 1/105 (2006.01)
A21D 2/00 (2006.01)

(52) U.S. Cl. .................. 426/618; 426/42; 426/463; 426/472; 426/578; 426/640

(58) Field of Classification Search ............... 426/618, 426/640, 42, 578, 463, 472
See application file for complete search history.

(56) References Cited

U.S. PATENT DOCUMENTS

| | | | | |
|---|---|---|---|---|
| 2,721,802 A | * | 10/1955 | Scalise ................ | 426/578 |
| 3,868,355 A | * | 2/1975 | Rodgers ................ | 530/374 |
| 4,248,896 A | * | 2/1981 | Wallace ................ | 426/19 |
| 4,919,952 A | * | 4/1990 | Sadaranganey et al. ..... | 426/254 |
| 6,451,553 B1 | * | 9/2002 | Olsen ................ | 435/68.1 |

FOREIGN PATENT DOCUMENTS

EP 000733646 A2 * 9/1996

OTHER PUBLICATIONS

Radley, J. A. Industrial uses of Starch and its derivatives. Applied Science Publishers LTD, London, 1976, p. 131.*

Whistler, Roy L. et al. Starch, Chemistry and Technology, $2^{nd}$, Ed., 1984, Academic Press, Inc. NY, p. 98.*

* cited by examiner

Primary Examiner—Helen Pratt
(74) Attorney, Agent, or Firm—Gauthier & Connors LLP

(57) ABSTRACT

The present invention relates to a process for the manufacture of a cereal product having an improved protein content and improved baking properties, whereby one mills cereals up to between 50 to 70% with regard to the kernel, that one from a part feed of said flour isolates native gluten and the content of water soluble constituents such as pentosans, that one add the native gluten thus isolated and constituents isolated, such as pentosans, to the remaining feed of flour, that the feed of flour being substantially freed from native protein and soluble constituents is used as such, or is further processed such as being subjected to an enzymatic hydrolysis to obtain a glucose syrup.

10 Claims, 5 Drawing Sheets

CEREAL PRODUCT AND PROCESS

This is a continuation of copending International Application PCT/SE01/00319 filed on Feb. 15, 2001 and which designated the U.S.

TECHNICAL FIELD

The present invention relates to process for the manufacture of a cereal product having an improved protein content and improved baking properties.

The object of the present invention is to obtain a process for the manufacture of a cereal product having a controlled, improved protein content and improved baking properties, not only based on the improved protein content but also on further baking products based on the same flour.

BACKGROUND OF THE INVENTION

Wheat which is used to a great extent within the baking industry for the production of different baked products contains a very varied content of gluten. Gluten, which is present in cereals in an amount of some percent up to 18% (wheat 7 to 18%) is a protein which contributes to the fact that a baked product, such as bread, sticks together. Gluten provides texture and elasticity to a dough and thereby the baked bread. Variations in the content of the gluten, however, creates large problems within the more industralized bakery industry which bases its business on given recipes, as well as it provides great problem to large users with defined quality of their baked products. Each product shall behave equally. The cereals oat, barley, and rye develop gluten to a more restricted degree.

One demand is thus to have a cereal product, primarily a wheat flour, having a constant content of gluten.

To improve softening and fresh holding properties of a bread malto dextrines are inter alia added today. Addition of individual components is however, costly and quite often, individually isolated components cost a lot, which restricts their use.

One problem to be solved is thus to add such properties to a flour and thereby add them in an optimal way to guarantee the quality of the starting flour.

In order that a bread shall be regarded as tasty it is important that it binds water, as well as it is important from a fresh holding point of view.

In order to improve this feature and to keep an even quality of the flour it is thus requested an addition of a water binding substance.

Cereals are milled to a high yield of flour, i.e., the milling is concentrated on getting as much as possible out of the starch content in the final flour. The cost for this will thereby become very high, as the energy required hereto increases radically with an increased flour out take.

One demand is thus to decrease the costs for milling.

At the milling of wheat the economy is based upon the fact that the milling of a flour amounts of about 70 to 80% of the kernel, as the remaining bran fraction has a small economical value as feeding product. In order to obtain an amount of gluten which is needed a mill can divide the flour into different fractions in order to mix the different flour qualities later on to a desired end product. The bakery industry requires a stronger flour (higher content of gluten) than what can be utilized at home baking. Thereby quite often a flour having a lower content of gluten is sold to house holds and flour having a higher content of gluten to the bakery industry. If cereals available can not reach the necessary content of gluten, gluten, which has been bought from the starch industry in a dried form, is often added to the flour. However, up to 20 to 25% of the vital properties of the gluten disappear at drying, which means that a certain over dosage is necessary to reach the desired amount. In particular in parts of the world where it is hard to grow wheat/rye/oat/barley having a high content of protein, cereals having a higher content of protein is imported to become mixed with a locally produced wheat. This provides for a better bakery flour than a flour having added dried gluten thereto. At the milling with a high yield of flour part of the aleurone layer (the inner most of four bran layers) will be part of the flour. This increases the protein content of the flour but unfortunately not with a protein which adds to good baking properties. Simultaneously herewith, this protein fractionation diminishes the value of the bran fraction. The protein of the aleurone layer is inter alia rich in lysin and is the protein which has a high nutritional content. Some years large rain falls occur at harvesting and harvest can only take place with a high water content. This leads to that a so called low fall number is obtained. This means that the enzyme activity of the flour is high, and that the flour is less suitable for baking purposes. Also this enzyme activity derives primarily from the outer layer of the cereal grain inter alia the aleurone layer. It has thus turned out that two essential advantages can be achieved by milling in such a way that the aleurone layer is not reached. This means in turn that the milling degree is decreased to 50 to 70% of the kernel. This means in turn that a considerably more simple milling equipment can be used, which in turn reduces the investment need. Further, the energy cost is markedly reduced.

It is further known to an enzymatically hydrolyse cereals, whole cereals or crushed cereals, as well as pure starch content to produce a sweetening syrup such as glucose syrup. Such syrup, carbohydrate composition, has sweetening properties and is suitable for baking purposes and encompasses an enzymatically hydrolysed cereal, such as hydrolysed wheat, rye, barley, oat, rye-wheat (Triticala), sorghum, corn and rice. The hydrolysis can thereby be carried out, starting from crushed whole cereal or flour using an alpha-amylase followed by an amyloglucosidase step to increase the glucose content of the product hydrolysed using the alpha-amylase. The final product comprises in a first step, a viscous maltose product rich in oligo-saccharides having a dry content of about 40% and, including step two, a product rich in glucose having a dry substance content of about 40%. By changing the water content the product can be obtained having a higher dry substance content leading to a higher degree of glucose. A dry product can be produced by spray drying, suitably in a conveyor spray drier. It is known that such hydrolysates have functional properties at baking and contributes thereby to inter alia a better consistency and prolonged fresh holding.

Thus there exist a number of problems within the bakery industry to be solved, viz to reduce costs for milling, improved contents of protein to guarantee the quality, improve softening and fresh holding properties.

DESCRIPTION OF THE PRESENT INVENTION

It has now surprisingly turned out possible to be able to solve these above mentioned problems by means of the present invention which is characterized in that one mills cereals up to a degree of 65% with regard to the kernel, that one from a part feed of said flour isolates native gluten and the content of water soluble constituents, such as pentosans, that one add the native gluten thus isolated and constituents isolated, such as pentosans, to the remaining feed of flour that the feed of flour being substantially freed from native protein and soluble constituents is used as such, or is further processed, such as made subject to an enzymatic hydrolysis to obtain a glucose syrup.

Further characteristics are evident from the accompanying claims.

Further, additional features and characteristics and problem-problem solutions will be evident from the following detailed description.

By means of the present invention there is obtained a flour, in particular a wheat flour, which shows a very high and even quality which is a prerequisite for a high and even quality of the end product, the baked bread.

The term bread hereby means all types of baked products based on flour, independent of it is a plain bread, a breakfast bread, a hamburger bread, crisp plain bread, a pizza dough, a soft cake, or biscuits, and so on.

The present invention will be described more in detail in the following with reference to some different flow sheets, however, without being restricted thereto. In the flow sheets of this drawing

BRIEF DESCRIPTION OF THE DRAWINGS

With reference to FIG. 1 there is shown as an example an ingoing wheat 1, which is milled in such a way that one obtains 60% of flour 2, and 40% of bran-flour 3, which later fraction 7 can be used either as a nutritional agent, feeding stuff, or become the starting material of an enzymatic hydrolysis. A third 4 of the flour fraction is then treated in a kneading process using water for washing out ingoing amounts of native gluten 5, which gluten is isolated. Further, there is obtained together with the wash water, soluble constituents, such as pentosans 6. This solution can be concentrated. Remaining starch 9 which is substantially freed from proteins is fed to a hydrolysing process for conversion into glucose 10. The remaining two thirds of the flour and isolated gluten and soluble constituents, such as pentosans are then combined to a protein enriched flour 8.

FIG. 2 shows a process which substantially corresponds to the basic process according to FIG. 1, but where the bran-flour obtained at the milling, is subjected to an enzymatic hydrolysis, whereby glucose syrup, protein and bran are obtained at end products. Usually glucose syrup and the protein fractions are gathered collected to a starch syrup. The hydrolysis takes place by adding the bran-flour 3 to preheated water (50 to 70° C.) to a dry substance content of 20 to 50% during simultaneous addition of enzymes, alpha-amylase (Ban 240L, (Novo)) and amyloglucosidase (AMG 200L (Novo)). pH is adjusted to 4.5 to 5.2. Heating/maintaining of the temperature of the starting material suspension to 50 to 75° C. is made during gelatinization for carrying out a complete hydrolysis reaction, complete carrying out of the hydrolysis reaction for a residence time of 3 to 4 hrs, heating to 90 to 95° C. for the deactivation of the enzymes present, isolation of the reaction product 14, which contains 50 to 75% of glucose based on the dry matter content, optionally in combination with evaporation and the separation off of fibres 15.

In a preferred process step an ultra filtration of the glucose syrup is carried out, whereby the glucose syrup is filtered at 50° C. through an ultra filter having a molecular cut of 20 to 100 kDa, whereby protein 12 present and fats are separated off and one obtains a substantially pure glucose syrup as filtrate. The glucose syrup is then evaporated under vacuo to about 75% dry substance and is thereby so pure that the glucose 13 obtained normally crystalizes with very fine crystals. The glucose syrup is soluble at temperatures over 55° C.

During hydrolysis of flour, starch, residual bread and other such starch containing material using amylase and amyloglucosidase and utilizing ultra filtration the enzymes are kept back in the concentrate while the smaller sugar molecules glucose, maltose, maltotriose can pass the membrane. This leads to that the amount of enzymes added can be used for a longer time period.

Figure 2:
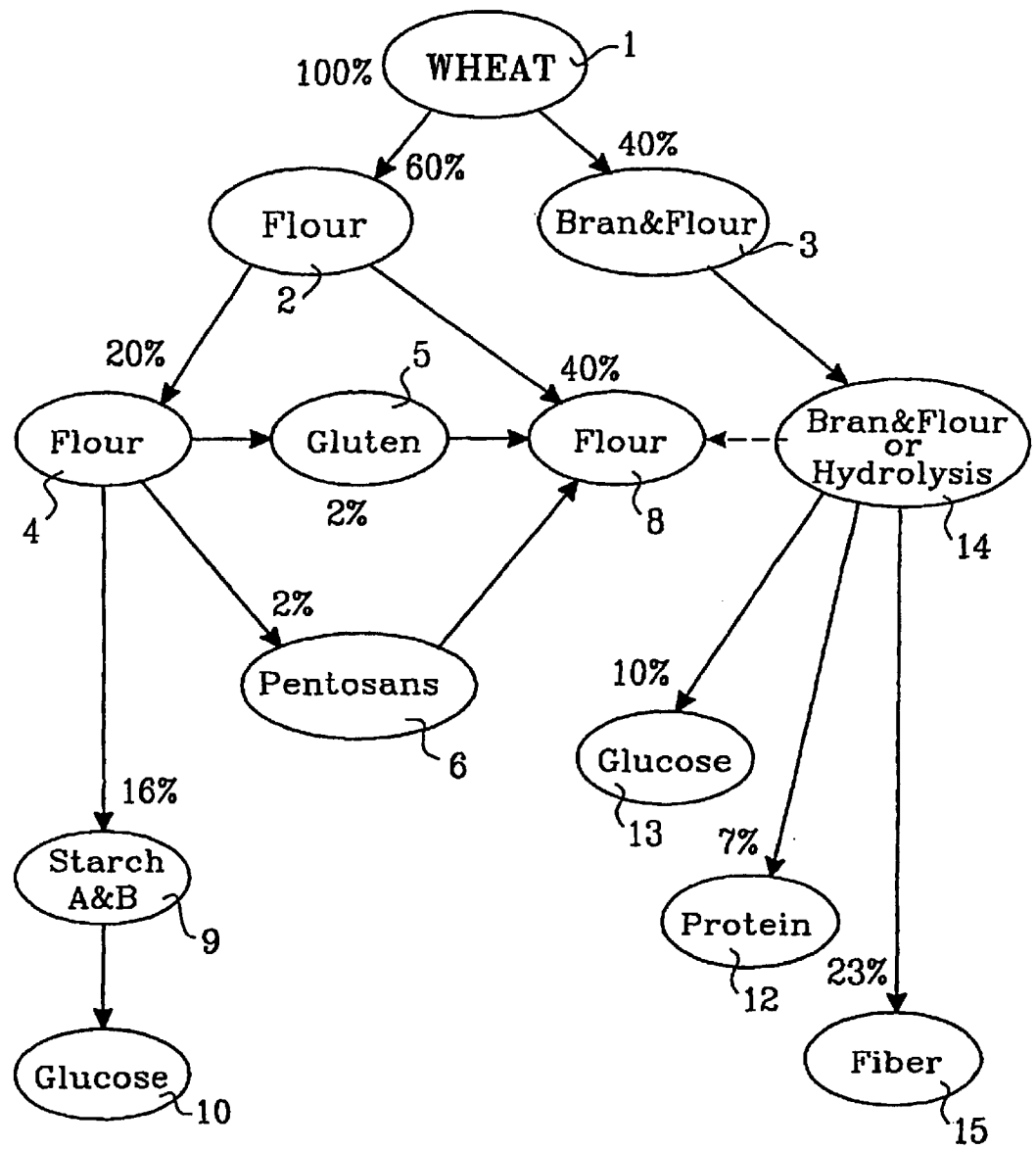
FIG. 2 is a scheme over the treatment partly according to FIG. 1, partly comprising further process steps.

The glucose syrup from the enzymatic hydrolysis can be added as well in a non-separated condition, the protein enriched flour 8, in order to thereby add a sweetening agent to the bakery starting material, now called 11 in FIG. 2.

In a particularly preferred embodiment a part feed of the raw material provided with alpha-amylase is taken out and is brought substantially directly (residence time/reaction time about 2 min) to the inactivation step where this fraction is reunited with the completely hydrolysed raw material feed. By means of this measure partly decomposed starch will be present, which decomposed product comprises inter alia dextrines, which provide better baking properties. The measure further means that a dry substance amount of the hydrolysed starch syrup of 40 to 50% can be obtained.

Figure 3:
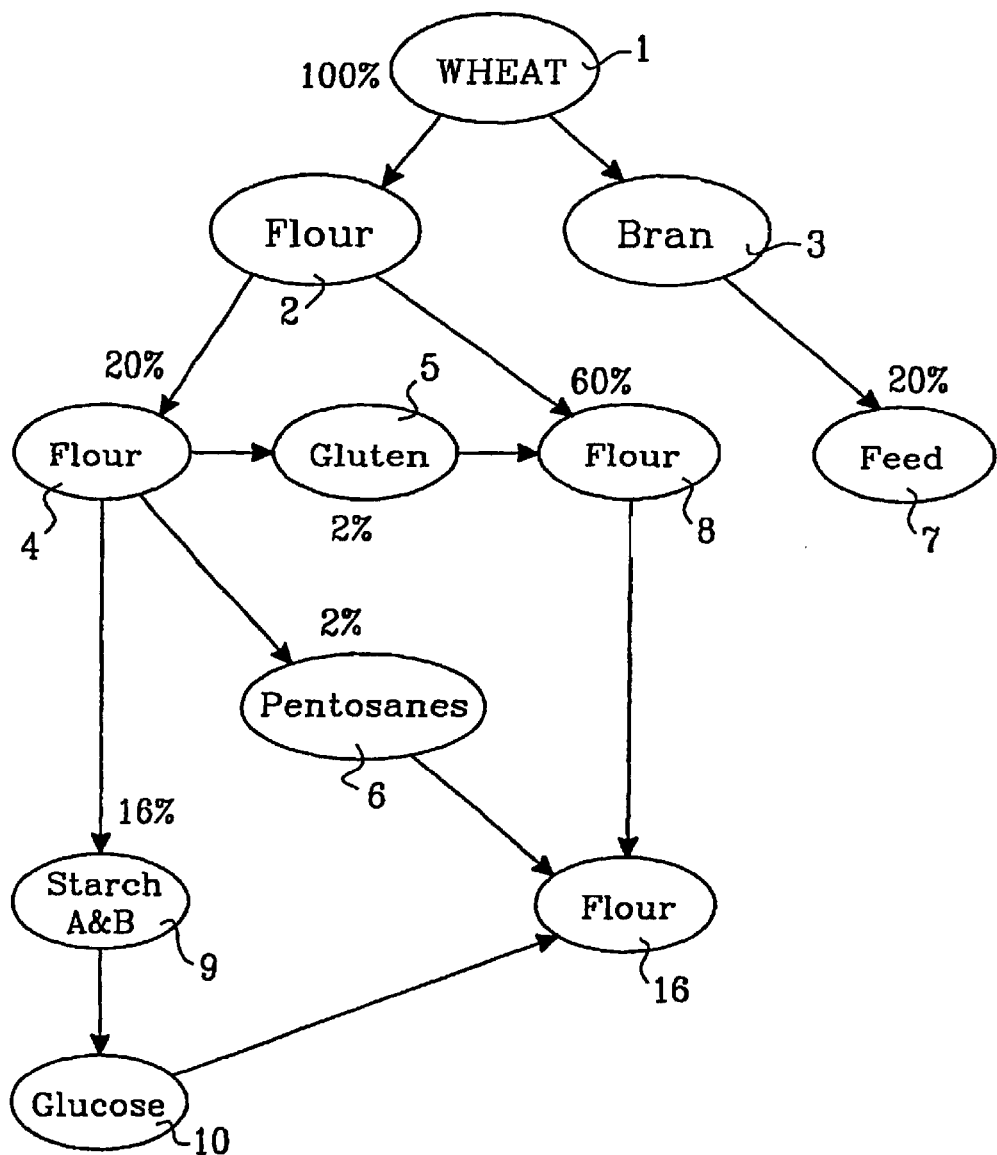
FIG. 3 is a scheme over the treatment partly according to FIG. 1, partly according to further, alternative process steps.

In one embodiment of the invention in accordance with FIG. 3 the starch 9 from the isolation of gluten is hydrolysed to glucose 10, which then is added to the gluten enriched flour 8, whereby one obtains a sweetened flour 16.

Figure 4:
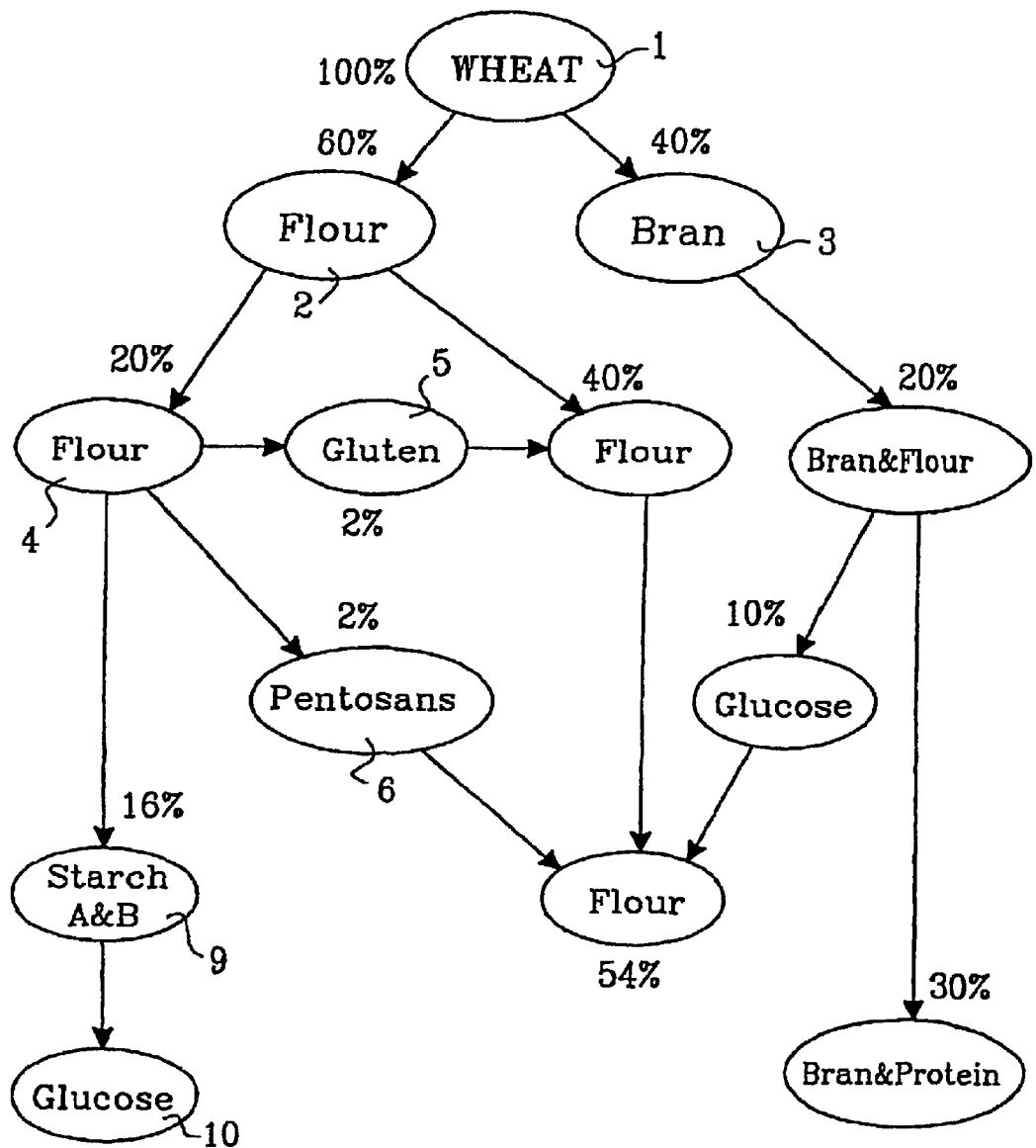
FIG. 4 is a flow sheet over the treatment partly according to FIG. 1, partly according to further, alternative process steps.

With reference to FIG. 4 there is shown an hydrolysis, whereby the glucose syrup obtained is added to the flour provided with soluble constituents.

Figure 1:
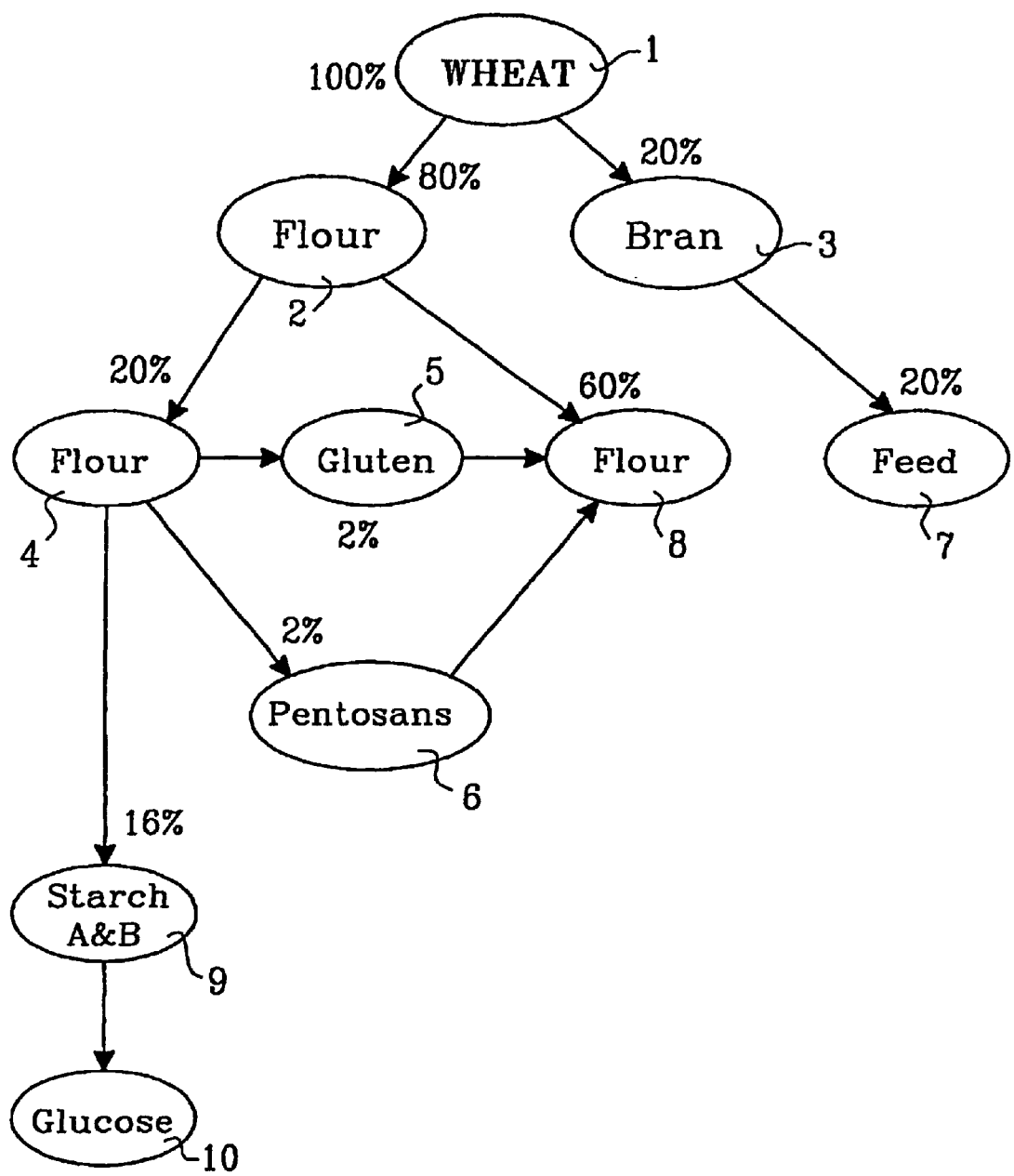
FIG. 1 is a basic scheme over the treatment of cereals according to the present invention.
Figure 5:
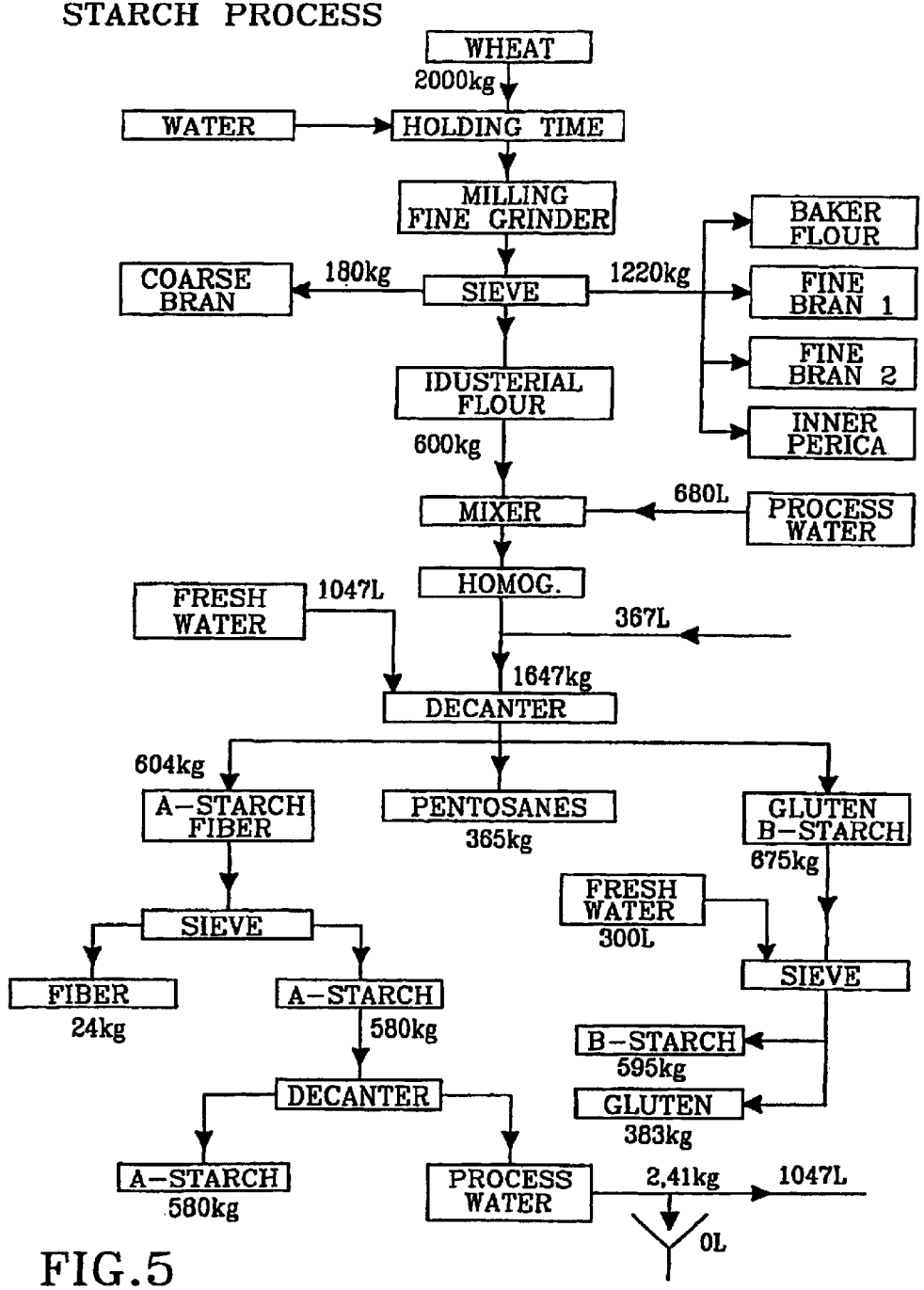
FIG. 5 is flow sheet illustrating a detail of the process according to FIG. 1 whereby wheat is introduced and moistened with water.

With reference to the flow sheet according to FIG. 5 a detail of the process according to FIG. 1 is shown. Hereby wheat is introduced and is moistened with water so that one obtains the optimal milling conditions, normally a humidity of 16 to 17%. The ground wheat is sieved, whereby a coarse fibre material is obtained in the form of bran, industrial flour and bakery flour including a fine fibre fraction and inner fruit layer. The industrial flour is brought to a mixer and water is added thereto and is homogenized. Then the homogenisate is transferred to a decanter for isolating starch, so called A-starch, and fibres, as one fraction, pentosans as one fraction, and gluten and so called B-starch as one fraction. The A-starch and fibres are sieved to obtain fibres and starch each individually, as well as gluten and B-starch are wet sieved to obtain gluten and B-starch each individually. The A-starch together with process water is transferred to a decanter for the separation of water and A-starch, whereby the water is recirculated as process water.

Addition of gluten in wet form in accordance with what has been stated above provides for a gluten quality similar to that of existing, native natural gluten. An alternative to the above mentioned wet fractionation is to separate off part of the starch in a dry fractionation such as by means of sieving.

By milling and sieving part of the starch is sieved off and in that way a higher gluten content can be obtained as well. The bran and flour fraction can be used in different ways, such as it is after dry fractionation, as feeding stuff or food stuff; be hydrolysed and be used wet or dried as feeding stuff of food stuff; separation off of the syrup and obtaining of fibre/protein as one phase, which can be dried or used as feeding stuff or food stuff; separation into three fractions—syrup, fibres, protein—which are dried or used wet as feeding stuff or food stuff.

The starch which is obtained after the separation off of the gluten can be dried and used as food stuff. The starch can be mixed with the flour to provide for a starch enriched flour, as well.

What is claimed is:

1. A process for the manufacture of a cereal product having an improved protein content and improved baking properties, comprising:
    milling cereals up to between 50 to 70% with regard to the kernel to form a flour feed and a remaining feed containing fibers-starch flour,
    separating the flour feed into a first part and a second part
    from the first part of the flour feed isolating native gluten and water soluble constituents containing pentosans,
    adding the native gluten thus isolated and constituents isolated, containing pentosans, to the second part of the flour feed,
    subjecting the first part of the flour feed, being substantially freed from native protein and soluble constituents, to an enzymatic hydrolysis for obtaining a glucose syrup,
    subjecting the remaining feed to an enzymatic hydrolysis to obtain a starch syrup, and
    adding the starch syrup to the second part of the flour feed.

2. A process according to claim 1, wherein the starch syrup obtained is fractionated through a decanter, and optionally a separator, and optional ultra filtration into glucose, proteins and fibres.

3. A process according to claim 1, wherein the starch being freed from native gluten and soluble constituents is subjected to an enzymatic hydrolysis to obtain a glucose syrup.

4. A process according to claim 1, wherein a part feed is removed at the enzymatic hydrolysis of the remaining feed of fibres-starch flour to starch syrup, which part feed is only partially hydrolysed using alpha-amylase to obtain a partially hydrolysed product containing inter alia dextrines.

5. A process according to claim 4, wherein the partially hydrolysed remaining feed is reunited with the completely hydrolysed feed of fibres-starch flour and is then added to the flour fraction being enriched with native gluten and said soluble constituents.

6. A cereal product containing flour of one or more cereals, wherein it comprises a flour consisting of 50 to 70% of ground cereals, from the same cereals isolated native gluten, and water soluble constituents present in said flour, from the same cereals derived starch syrup based on a hydrolysed remaining feed of fibres-flour.

7. A cereal product according to claim 6, wherein the hydrolysed starch syrup contains partially hydrolysed starch.

8. A cereal product according to claim 7, wherein the partially hydrolysed starch is a partially, using alpha-amylase enzymatically hydrolysed starch having a content of dextrines, maltotriose, and maltose.

9. A cereal product according to claim 6, wherein the starch being substantially freed from native protein is dried.

10. A cereal product according to claim 6, wherein the starch being substantially freed from native protein is mixed into a flour to obtain a starch enriched flour.

* * * * *